United States Patent [19]

Lu et al.

[11] Patent Number: 5,776,604
[45] Date of Patent: Jul. 7, 1998

[54] COATING FOR PRINTABLE PLASTIC FILMS

[75] Inventors: Pang-Chia Lu, Pittsford; Gordon Musclow, Henrietta, both of N.Y.; Robert Michael Sheppard, Luxembourg, Luxembourg

[73] Assignee: Mobil Oil Corporation, Fairfax, Va.

[21] Appl. No.: 582,819

[22] Filed: Jan. 4, 1996

Related U.S. Application Data

[63] Continuation-in-part of Ser. No. 383,133, Feb. 3, 1995.

[51] Int. Cl.$^6$ .................... B32B 27/30; B32B 27/32; C08K 3/00; C08K 5/3492

[52] U.S. Cl. ................ 428/343; 427/412.3; 427/569; 428/516; 428/520; 524/91; 524/237; 524/442; 524/445; 524/447; 524/451; 524/842

[58] Field of Search .................... 428/343, 515, 428/520, 525, 327, 331, 516; 427/407.1, 412.3, 569; 524/845, 447, 442, 445, 451, 237, 91

[56] References Cited

U.S. PATENT DOCUMENTS

| | | | |
|---|---|---|---|
| 3,598,642 | 8/1971 | Huang et al. | 117/138.8 |
| 3,753,769 | 8/1973 | Steiner | 117/122 H |
| 4,226,754 | 10/1980 | Yun et al. | 260/29.6 TA |
| 4,486,483 | 12/1984 | Caines | 428/195 |
| 4,749,616 | 6/1988 | Liu et al. | 428/331 |
| 4,887,097 | 12/1989 | Akiya et al. | 346/135.1 |
| 5,166,242 | 11/1992 | Chu et al. | 524/238 |
| 5,244,861 | 9/1993 | Campbell et al. | 503/227 |
| 5,288,548 | 2/1994 | Weber | 428/315.6 |
| 5,330,831 | 7/1994 | Knoerzer et al. | 428/353 |
| 5,350,733 | 9/1994 | Campbell et al. | 503/227 |
| 5,387,574 | 2/1995 | Campbell et al. | 503/227 |
| 5,399,218 | 3/1995 | Harrison et al. | 156/229 |
| 5,451,460 | 9/1995 | Liu et al. | 428/349 |
| 5,494,745 | 2/1996 | Vander Velden et al. | 428/354 |

FOREIGN PATENT DOCUMENTS

| | | |
|---|---|---|
| 0 232 040 A2 | 1/1987 | European Pat. Off. |
| 0 233 703 A2 | 11/1987 | European Pat. Off. |
| 0 317 166 | 5/1989 | European Pat. Off. |
| 0 405 248 A2 | 6/1990 | European Pat. Off. |

OTHER PUBLICATIONS

"Surface Modification" Encyclopedia of Polymer Science and Engineering, Sup. vol., pp. 674–689, 1985.

"Stabilization" Encyclopedia of Polymer Science and Engineering vol. 15, pp. 563–568, 1985.

*Primary Examiner*—Paul J. Thibodeau
*Assistant Examiner*—D. Lawrence Tarazano
*Attorney, Agent, or Firm*—Jessica M. Sinnott; Dennis P. Santini

[57] ABSTRACT

The invention provides a lithographic printable plastic film. A plastic film is coated with a coating formulation which allows lithographic printing on plastic films. The coating composition comprises an acrylic binder, specifically a blend of acrylic polymer and ethylene-acrylic acid copolymer, at least one particulate filler, specifically silica, calcium carbonate, clay, talc, titanium dioxide and mixtures thereof, a surfactant and, optionally, an ultraviolet stabilizer. The coating composition is applied to a plastic film for lithographic printing.

21 Claims, No Drawings

COATING FOR PRINTABLE PLASTIC FILMS

CROSS REFERENCE TO RELATED PATENT APPLICATIONS

This application is a continuation-in-part to copending U.S. application Ser. No. 08/383,133 filed on Feb. 3, 1995 in the name of Pang-Chia Lu.

FIELD OF THE INVENTION

This invention relates to a coating composition which enhances the printability of plastic surfaces, particularly plastic films.

BACKGROUND OF THE INVENTION

Lithography is the process of printing from a specially prepared printing plate. The image areas of the plate are treated to accept ink, while the non-image areas, when moistened with water, repel ink. The areas which accept ink form the printed image and the ink repelling areas form the background. Because the process is based on the principle that oil and water do not mix, the ink is oily or greasy. The image is typically formed on a lithographic printing plate by mounting a photosensitive film having hydrophobic and hydrophilic areas onto an aluminum plate. A reverse print image is placed above the photosensitive film and upon exposure to UV light, the reverse image transfers to the photosensitive film to form the hydrophobic and hydrophilic areas of the printing plate.

During the printing process, the printing plate is continuously wetted with water and ink. The water is selectively taken up by the hydrophilic areas and the ink by the oleophilic areas of the printing surface. The ink is continuously conveyed from an ink source by means of a series of rollers to the printing plate located in the printing press, usually on a plate cylinder. Image portions of the printing plate that accept ink transfer the ink to a blanket cylinder as a reverse image. A portion of the ink from the blanket cylinder is then transferred to form a correct reading image on paper. The image formed by the lithographic printing ink hardens by exposure to air, in a process known as curing.

Lithographic ink is a dispersion of pigment in a viscous oil medium. One type of ink contains a drier, which accelerates curing of the medium after printing. There are also solventless inks which can be cured by UV and electron-beam radiation. Typically curing occurs upon exposure to air for a length of time ranging up to 24 hours. Printed paper can be formed into a stack or wound into a roll for curing without concern for smearing because the ink forming the image penetrates the spaces between the fibers forming the paper.

Although lithographic printing provides the advantages of allowing fine print and good detail, it has not been used with plastic films. Because plastic films have smooth surfaces the ink tends to smear when the film is wound into a roll or formed into a stack, also the ink tends to transfer to the backside of adjacent sheets in a roll or stack. Because it is economically impractical to allow the ink to cure before rolling or stacking the film, lithographic printing has not been used for plastic films. Additionally the high static associated with plastic films tends to make stack press printing impractical because of machine jamming.

Flexographic printing and rotogravure printing techniques have been used to print onto plastic films. In these processes a solvent or water based ink is employed. Prior to winding the printed film into a roll or forming a stack, the ink is dried by passing the film sheet through an oven. These printing processes require a printing plate which is expensive to prepare and expensive drying ovens.

The use of thermoplastic stretch wrap films in the overwrap packaging of goods, and in particular, the unitizing of palleted loads is a commercially important use for polymer films. In these applications, the film is wrapped around the load or goods to be packaged and the film is continuously subjected to a stretching or tensioning force as it wraps around the load. This type of packaging is useful for shipping goods since it contains goods as a unit and is resistant to moisture. Since, during shipping, the wrapped packages are exposed to outside conditions, the entire packaging assembly is likely to be subjected to extremes of moisture, heat and light. Laminated paper packaging labels containing shipping and product information are acceptable for outdoor use but they pose problems in the recycling of the stretch wrap. The paper labels must be removed prior to recycling. Therefore, the development of lithographic printable plastic labels which are resistant to moisture, heat and light is important.

SUMMARY OF THE INVENTION

The invention is directed to a printable coating composition which comprises an acrylic-based emulsion which includes inorganic particulates and a surfactant. In one embodiment, the invention includes an ultra violet light stabilizer additive. The special coating formulation of this invention overcomes prior difficulties in the printing, especially lithographic printing, of plastic films.

DETAILED DESCRIPTION OF THE INVENTION

The printable coating composition of the present invention comprises an acrylic binder containing particulates and a surfactant.

The acrylic binder contemplated comprises a thermoplastic homopolymer or copolymer of a carboxylic acid containing vinylic unsaturation such as acrylic acid or methacrylic acid or ester of those acids. The acrylates contemplated contain lower alkyl groups such as those ranging from about 1 to about 16 carbon atoms, specific examples include methyl, ethyl, butyl, lauryl and stearyl. Useful acrylic resins may be modified with non-acrylic monomers such as acrylonitrile, butadiene and/or styrene.

Acrylic polymer binders are well known in the art and are described in U.S. Pat. Nos. 3,753,769; 4,058,645 and 4,749,616.

A particularly useful thermoplastic copolymer is ethylene-acrylic acid available commercially under the tradename Michem, particularly Michem-4983, by Michelman Corporation. Ethylene-acrylic acid is, typically, produced by high pressure copolymerization of ethylene and acrylic acid. When ethylene is copolymerized with acrylic acid, the molecular structure is significantly altered by the random inclusion of bulky carboxylic acid groups along the backbone and side chains of the copolymer. The carboxyl groups are free to form bonds and interact with any poly substrate. Commercially available ethylene-acrylic acid copolymers are Primacor 4983 sold by Dow Chemical Co. an aqueous dispersion having 25% solids content and obtained from a reaction between 15 mole% acrylic and 85 mol% ethylene. Other acrylic emulsions that may be employed are those sold under the name of Acrylic, particularly Acrylic 79XW318A, 89XW055 and 90XW067 by Valspar Corporation. Rohm and Haas also makes a heat seal acrylic coating sold under the tradename ROHPLEX which may be useful. Additional contemplated thermoplastic materials include ionomer resins such as those known as "Surlyn" emulsions which can be obtained commercially under the name of Adcote, particularly adcote 56220 by Morton International and thermoset materials such as melamine formaldehyde resins, available under the name Parez, particularly Parez-613 by Cytech Company.

The total amount of the binder can range from about 20% to about 80%, specifically about 30% to about 60% by weight based on the entire weight of the coating composition.

The binder can be entirely acrylic polymer or it can be entirely ethylene-acrylic acid copolymer. For some applications a combination of acrylic polymer and ethylene-acrylic copolymer is preferred. Usually, when there is no acrylic polymer, pigment dispersion is poor and so is adhesion of the coating to the substrate. If there is no ethylene-acrylic acid copolymer, the coating tends to be moisture sensitive. Thus, a balance between the acrylic polymer and the ethylene-acrylic acid copolymer is preferred. When a combination is employed, the preferred amount is 5 to 50% by weight of acrylic polymer and 95 to 50% by weight of ethylene-acrylic acid copolymer. A typical formulation includes 5 to 20 wt. % acrylic polymer and 95 to 80 wt. % ethylene-acrylic acid copolymer based on the entire weight of the combination.

Another component of the formulation comprises at least one ink receptivity enhancing particulate additive.

The particulate additive, often referred to as filler, comprises finely divided inorganic solid materials such as silica, including fumed silica, talc, diatomaceous earth, calcium silicate, bentonite and clay. The amount of filler comprises a substantial percentage of the weight of the coating, typically, about 20% to about 80%, specifically from about 30% to about 60% based on the entire weight of the coating. The particulates are generally small in size, typically ranging from about 1 μm to about 10 μm, specifically from about 3 μm to about 7 μm. Specific examples of fillers include kaolin, silica (also known for antiblocking properties), aluminum silicates, clay and talc. Pulp may also be employed.

Opacity enhancing particulates which will possibly enhance the ink receptivity of the coating may also be employed. These are relatively inert substances. Calcium carbonate is extensively used in thermoplastics, it is relatively inexpensive and easy to use. It can be used in its natural form but "precipitated calcium carbonate" which is prepared by chemical processes can be employed. Sometimes, particles of calcium carbonate are coated with a resin to reduce plasticizer absorption and this form can also be employed.

Particulates which provide pigmentation may also be used. Pigments contemplated are organic or inorganic substances with particle sizes which are rarely less than 1 micron in diameter. Typical pigments include carbon black and titanium dioxide. Calcium carbonate can also act as a pigment. Other pigments not to be excluded by this invention are metallic pigments such as particles of aluminum, copper, gold, bronze or zinc. These pigments are usually flake shaped particles which reflect light when incorporated into the coating vehicle.

The ink absorbing material, opacifying particulates and/or pigment are usually used in combination, depending upon the desired degree of translucency or opacity. Typically the opacifying particulates and/or pigment concentration ranges from about 5% to about 70% of the total particulate concentration of the coating, specifically about 10% to about 45% of the total particulate concentration of the coating.

Further specific examples of particulates which may be employed in addition to those noted above include acetylene black, alpha cellulose, aluminum silicates, barium sulfate, calcium silicate, calcium sulphate, cellulose, clays, diatomite, glass flake, keratin, lignin, lithophone, mica, microballoons, molybdenum disulfide, nepheline syenite, paper, pulp, quartz, shell flour, talc, vermiculite and wood.

The invention further comprises an optional ultra violet stabilizer additive. This is a chemical agent which absorbs or screens out radiation beyond the violet end of the spectrum of visible radiations to prevent radiation catalyzed reactions which degrade plastic. Typical UV absorbers are benzophenone, benzotriazoles, including hydroxyphenylbenzotriazole, substituted acrylonitriles, salicylic derivatives and nickel complexes. Care must be taken with certain UV stabilizers, such as benzophenone, which may act as a thickening agent. A contemplated UV stabilizer is commercially available benzotriazole "Tinuven 1130" available from Ciba-Geigy, "UV5411" available from Cytec, and "Mixxim BB/200" available from Fairmont. Commercially available benzophenone can be obtained from BASF under the name "Uvinul 3048" or from Great Lakes Chemical under the name "Syntase 230". Another commercially available UV absorber is an oxalanilide sold under the name "VP Sanduvor VSU" by Sandoz. The UV absorber is, typically, used in combination with a free-radical scavenger which halts any UV catalyst reactions. Typical free-radical scavengers include hindered amines including hindered aminoether light stabilizers. Contemplated commercially available hindered amines include "Tinuven 123" sold by Ciba-Geigy, "Uvasil 299" sold by Enichem and "BLS 1770" sold by Mayzo. Commercially prepared UV absorber/free radical scavenger packages are available such as "VP Sanduvor 3225" sold by Sandoz. Typically, when using a UV absorber and a free-radical scavenger in combination, the concentration of free-radical scavenger ranges from about 10% to about 60%, preferably about 20% to about 40% by weight based on the entire amount of UV stabilizer additive employed. The total amount of UV stabilizer additive package that is useful in the coating compositions of this invention comprises about 1 to 15%, specifically 2 to 8% by weight of the entire coating composition. Usually, the UV stabilizers are blended in a hydrocarbon solvent, specifically, alcohol solvent which is miscible with water. Typically, the amount of alcohol employed is sufficient to solubilize the UV stabilizer additives, the amount ranging from about 0.5% to about 5% by weight based on the entire weight of the coating.

The coating composition further comprises, in relatively minor amounts, a surface active agent which facilitates dispersion of the particulates. This component is especially important to disperse the UV stabilizer. Any suitable surface active agent which promotes coating stability can be employed. Anionic emulsifiers are contemplated. They include alkali metal and ammonium salts of the sulfates of alcohols having from 8 to 18 carbon atoms such as sodium lauryl sulfate, ethanolamine lauryl sulfate and ethylamine lauryl sulfate, alkali metal and ammonium salts of aromatic sulfonic acids such as dodecane-1-sulfonic acid and octadiene 1-sulfonic acid, aralkylsulfonates such as sodium isopropyl benzene sulfonate, sodium dodecyl benzene sulfonate and sodium isobutyl naphthalene sulfonate, alkali metal and ammonium salts of sulfonated dicarboxylic acid esters such as sodium dioctyl sulfosuccinate and disodium N-octadecylsulfosuccinamate, alkali metal or ammonium salts of free acids of complex organic mono and diphosphate esters, and the like. Non-ionic emulsifiers such as octyl or nonylphenyl polyethoxyethanol, and the like, may also be used. Mixtures of the foregoing are also contemplated. A specific emulsifier is the disodium ethoxylated alcohol ($C_{10}$–$C_{12}$) half ester of sulfosuccinic acid available from American Cyanamide Company sold under the tradename Aerosol A-102 or the disodium ethoxylated nonylphenol half esters of sulfosuccinic acid (Aerosol A-103). Another specific emulsifier is the sodium salt of an alkylaryl polyether sulfonate available from Rohm and Haas Company under the tradename "Triton X-200" or "Triton X-405" an ethylene oxide derivative. Another useful emulsifier is "Tergitol 15-5-9".

An effective amount of surface active agent, sufficient to disperse the UV stabilizer and particulates may be used. The amount can range from about 0.5 wt. % to about 10 wt. % of the total weight of the coating, specifically about 1 wt. % to about 7 wt. % of the total weight of the coating.

Traditional coating additives can also be included in the coating of this invention. Typically such materials include modifiers to improve the coefficient of friction, surface slip and antiblocking properties. Specific examples of such modifiers include natural waxes such as paraffin wax, microcrystalline wax, beeswax, carnauba wax, montan wax (lignite wax), etc. and synthetic waxes such as hydrogenated castor oil, chlorinated hydrocarbon waxes, long chain fatty acid amides and the like. Other modifiers that can be added to the coating mixture include one or more wetting agents, crosslinking agents, stabilizers, catalysts, plasticizers, defoamers, slip agents, anti-static agents and antioxidants.

The coating is made by combining all the ingredients sequentially or at the same time and mixing or blending them at room temperature and atmospheric pressure conditions in a conventional mixing apparatus. Typically, the coating is in an aqueous media having a solid content of about 10 to 80%, typically 25 to 60% based on the entire weight of the final coating composition.

Typically the film to be treated with the coating of this invention is formed by extruding a polyolefin resin, such as polypropylene, through a flat sheet extruder die at a temperature ranging from between about 200° to about 250° C. casting the film onto a cooling drum and quenching the film. The sheet is then stretched about 3 to about 7 times in the machine direction (MD) orienter followed by stretching about 5 to about 10 times in the transverse direction (TD) orienter.

The film to be treated with the coating of this invention can include any single or multi-layer thermoplastic material that can be formed into a thin film. Contemplated materials include any polyolefin such as polypropylene, polyethylene, polybutene, polystyrene, polyvinyl chloride, copolymers and blends thereof. Other film materials contemplated include polyethyleneterephthalate and nylon. In multilayer films there are one or more skin layers located on at least one surface of a thermoplastic core layer. The skin layer can comprise polyethylene, including medium and high density polyethylene, polypropylene, copolymer or terpolymer of $C_2$–$C_5$ alpha olefins or blends thereof. At least one side of the film can comprise a heat seal or pressure seal surface. Typical heat seal materials comprise ethylene and propylene homopolymers, copolymers or terpolymers such as ethylene-propylene, ethylene-propylene-butene-1, and polyvinyldichloride polymers. Any of the materials can contain inorganic particulates such as titanium dioxide to enhance the whiteness or color of the substrate or to enhance antiblocking properties.

A primer enhances binding of the coating of this invention to the uncoated film. Typical primers are polymers with good adhesion to the uncoated films such as polyethyleneimine and epoxy resins.

In one embodiment of the invention, the final printed film is adhered to an object. Any conventional glue can be employed to adhere the film. Glues contemplated are pressure sealable, hot melt or water-based. The coating of this invention will not interfere with the adhesive. Thus, the adhesive can be applied to the print side of the film so that the printed surface will face the object to which it is applied. This is useful when it is desirable to read the print through the object, e.g. a glass window or a clear plastic container.

Typically, prior to coating the film with the final formulated composition of this invention, the film surface is treated to create a high energy surface environment sufficient for the adhesion of a primer or other coating such as by flame or corona treatment or other method which can oxidize the film surfaces. Corona treatment is accomplished by exposing the film surface to a high voltage corona discharge while passing the film between spaced electrodes. After electronic treatment of the film surface, the coating can be applied.

The coating can be applied to the substrate as an aqueous emulsion in-line after the machine direction orientation but before the transverse direction orientation. This procedure is described in U.S. Pat. No. 5,451,460. The uniaxially drawn film may be subjected to surface treatment prior to coating.

Alternatively, the coating can be applied off-line, by any conventional method. For example, the film can be coated by roller coating, spray coating, slot coating or immersion coating. Gravure roll coating or reverse direct gravure coating are acceptable methods. The excess coating solution can be removed by squeeze rolls or doctor knives.

Regardless of the method by which the coating is applied, the amount should be such that upon drying a smooth, evenly distributed layer is obtained. A preferred coating weight ranges from about 3 to about 9 g/m$^2$.

The substrate can be of any desired thickness, although thicknesses will typically range from about 20 to about 100 microns for high speed equipment.

In one aspect of the invention, the coating is employed on labels for stretch wrap packaging film.

In any event, the coating composition of this invention may be applied to both surfaces of the film. Alternatively, one surface may have another coating composition applied to it or a substrate such as another polymer film or laminate, a metal foil such as aluminum foil, cellulosic webs, paper, spunbonded polyolefin fiber, a suitable adhesive such as a hot melt or room temperature sealable adhesive or water based adhesive.

It has been found that while the coating of this invention enables thermoplastic films to be used in lithographic printing, the coating also imparts antistatic properties to the film which prevents machine jamming in sheet printers.

EXAMPLES

Comparison Example

Attempting to print uncoated corona treated oriented polypropylene film by lithographic printing results in ink smearing, sticking of film surfaces and high static between sheets of film.

EXAMPLE 1

A lithographic print enhancing coating is prepared by combining 38% ethylene-acrylic acid copolymer ("Michem 4983"), 5.9% acrylic polymer (available from Valspar), 38% Syloid 221 sold by Davison, a division of W. R. Grace, 15.6% calcium carbonate and 2.5% Triton X-405 surfactant in aqueous solution.

The coating is applied to a biaxially oriented polypropylene film such as 155LLX1008 sold by Mobil Chemical Company. The film is made by orienting polypropylene 5 times in the machine direction and 8 times in the transverse direction. The biaxially oriented film is corona treated and primed with a commercial polyethyleneimine primer. The lithographic print enhancing coating is applied to the primed surface using a reverse direct gravure coater. The coating weight is 3 grams/m$^2$. The coating is dried at 105° C. The resulting film is designated Film A.

EXAMPLE 2

The same surface treated and primed oriented polypropylene film is coated off line as described in Example 1 with the same lithographic print enhancing coating except that 6.6% of the coating is replaced with UV stabilizers in amounts of 4.4% Tinuvin 1130 and 2.2% Tinuvin 123. The UV stabilizers are blended in 14% n-butanol solvent. The resulting film is designated Film B.

EXAMPLE 3

A lithographic print enhancing coating is made by combining 19.9% ethylene-acrylic acid copolymer, 10.3% acrylic polymer, 32.4% clay, 25.8% talc, 6.4% titanium dioxide and 5.2% of commercial antistatic, suspension aid and defoamer additives in aqueous solution. This mixture is prepared to a solids concentration of 46 to 48%.

A biaxially oriented polypropylene film such as 260 LLG202 sold by Mobil Chemical Company is treated to a dyne level of 38 dynes/cm. A polyethyleneimine primer sold by Daubert Chemical and which contains 1.9% polyethyleneimine, 0.5% hexocellosolve and 97.6% water is applied to a surface of the film. The print enhancing coating is applied to the primed surface using a reverse direct gravure coater to a coat weigh of 3.75 g/m$^2$. The coating is air dried at a temperature of 93° C. The resulting film is designated Film C.

Evaluation of the Coatings

Films A and B are evaluated for lithographic ink printability by ink drawn down tests with a commercially available lithographic ink supplied by Flint. The films are also tested on a sheet fed Heidelburg lithopress. In the ink draw down test, ink is applied to the film. Promptly after applying the ink an attempt is made to smear the ink by hand rubbing the freshly printed sheet. The film sample is also visually examined for color bleeding and print definition. The films of the examples demonstrate fast ink absorption, minimal smear and good ink color density. Additionally, the printed sheets are examined to determine whether ink transfers from one sheet to the back of another in a stack of sheets which forms during the printing process. Minimal to no ink transfer is observed.

To determine UV stability, the film samples are cut into two inch strips and exposed to UV light on a QUV Accelerated Weathering Tester following the procedure of ASTM D-4587-86, procedure A. After 1000 hours of exposure, the film sample of example 2 in which the coating contained the UV stabilizer additive shows no physical change. The film sample of example 1 which does not contain the UV stabilizer exhibits unacceptable cracking, yellowing and puckering.

Film sample C is tested using three different lithographic sheet fed presses: Mitsubishi, Harris and Heidelberg. All of the tests are conducted using standard lithographic inks such as those manufactured by Flint or Braden-Sutphin. The printed film demonstrates characteristics similar to paper: excellent smudge resistance and minimal transfer of ink to the facing sheet. Excellent antistatic properties are observed with no jamming of the printing press at 80% of maximum line speed.

Film C is also subjected to accelerated UV testing using the QUV accelerated Weather Tester following ASTM D4587-86, procedure A. There is no noticeable degradation of the film surface even after 750 hours.

What is claimed is:

1. A coating composition for lithographic printing of a thermoplastic substrate comprising:
    (a) about 20 to about 80 weight percent based on the entire weight of the coating of a binder composition consisting of about 5 to about 50 weight percent of a homopolymer of acrylic acid and about 95 to about 50 weight percent of an ethylene acrylic acid copolymer;
    (b) about 20 to about 80 weight percent, based on the entire weight of the coating, of at least one finely divided particulate filler selected from the group consisting of silica, talc, diatomaceous earth, calcium silicate, bentonite and clay;
    (c) about 1 to about 15 weight percent, based on the entire weight of the coating, of at least one ultraviolet stabilizer additive; and
    (d) about 0.5 to about 10 weight percent, based on the entire weight of the coating, of a surface active agent.

2. The coating described in claim 1 which further comprises (e) an inorganic opacity enhancing particulate and/or pigment imparting particulate.

3. The coating described in claim 1 in which the ultraviolet stabilizer additive is selected from the group consisting of benzotriazoles and substituted acrylonitriles.

4. The coating described in claim 3 which further comprises an ultraviolet stabilizer additive selected from the group consisting of free-radical scavengers.

5. The coating described in claim 4 in which the free-radical scavenger is a hindered amine.

6. The coating described in claim 2 in which the opacity enhancing particulate is calcium carbonate.

7. The coating described in claim 2 in which the pigment is titanium dioxide.

8. The coating described in claim 1 in which the surface active agent is an anionic emulsifier or non-ionic emulsifier.

9. The coating described in claim 1 in which the surface active agent is selected from the group consisting of sodium salt of an alkylaryl polyether sulfonate, ethylene oxide derivative and mixture thereof.

10. The coating described in claim 1 in which the solids content ranges from about 10 to about 80% based on the entire weight of the final coating composition.

11. A lithographic printable thermoplastic substrate comprising: a polyolefin substrate treated on at least one surface with a coating composition comprising:
    (a) about 20 to about 80 weight percent based on the entire weight of the coating of a binder composition consisting of about 5 to about 50 weight percent of a homopolymer of acrylic acid and about 95 to about 50 weight percent of an ethylene acrylic acid copolymer;
    (b) about 20 to about 80 weight percent, based on the entire weight of the coating, of at least one finely divided particulate filler selected from the group consisting of silica, talc, diatomaceous earth, calcium silicate, bentonite and clay;

(c) about 0.5 to about 10 weight percent, based on the entire weight of the coating, of a surface active agent.

12. The film of claim 11 in which the polyolefin substrate comprises biaxially oriented polypropylene.

13. The film of claim 12 in which the biaxially oriented polypropylene is surface treated by corona discharge or flame treatment.

14. The film of claim 13 in which the biaxially oriented polypropylene is primed with polyethyleneimine primer.

15. The film of claim 11 which further comprises (e) an inorganic opacity enhancing particulate and/or pigment imparting particulate.

16. The film described in claim 15 in which the opacity enhancing particulate is calcium carbonate and the pigment is selected from the group consisting of titanium dioxide.

17. The film described in claim 11 in which the surface active agent is selected from the group consisting of sodium salt of an alkylaryl polyether sulfonate, ethylene oxide derivative and mixtures thereof.

18. The film of claim 11 which further comprises about 1 to about 15 wt. %, based on the entire weight of the coating, of at least one ultraviolet stabilizer additive selected from the group consisting of benzotriazoles, substituted acrylonitriles and hindered amine free-radical scavengers.

19. The film of claim 11 in which at least one surface of the film has an adhesive or glue thereon.

20. A method of coating a thermoplastic substrate comprising the step of applying to a thermoplastic substrate comprising a biaxially oriented polypropylene film a coating composition comprising:

(a) about 20 to about 80 weight percent based on the entire weight of the coating of a binder composition consisting of about 5 to about 50 weight percent of a homopolymer of acrylic acid and about 95 to about 50 weight percent of an ethylene acrylic acid copolymer;

(b) about 20 to about 80 weight percent, based on the entire weight of the coating, of at least one finely divided particulate filler selected from the group consisting of silica, talc, diatomaceous earth, calcium silicate, bentonite and clay;

(c) about 1 to about 15 weight percent, based on the entire weight of the coating, of at least one ultraviolet stabilizer additive selected from the group consisting of benzotriazoles, hindered amine free-radical scavengers and mixtures thereof, and (d) about 0.5 to about 10 weight percent, based on the entire weight of the coating, of a surface active agent.

21. The method of claim 20 in which the coating further comprises (e) about 10 to about 70 wt. % of an inorganic opacity enhancing particulate selected from the group consisting of calcium carbonate and/or a pigment imparting particulate selected from the group consisting of titanium dioxide.

* * * * *